US012689460B2

(12) United States Patent
Liu et al.

(10) Patent No.: US 12,689,460 B2
(45) Date of Patent: Jul. 21, 2026

(54) ENHANCED LONG RANGE COMMUNICATION SCHEMES IN WIRELESS COMMUNICATIONS

(71) Applicant: MediaTek Inc., Hsinchu City (TW)

(72) Inventors: Jianhan Liu, San Jose, CA (US);
Shengquan Hu, San Jose, CA (US);
Gary A. Anwyl, San Jose, CA (US);
Thomas Edward Pare, Jr., San Jose,
CA (US)

(73) Assignee: MediaTek Inc., Hsinchu City (TW)

( * ) Notice: Subject to any disclaimer, the term of this patent is extended or adjusted under 35 U.S.C. 154(b) by 0 days.

(21) Appl. No.: 18/195,291

(22) Filed: May 9, 2023

(65) Prior Publication Data

US 2023/0370189 A1 Nov. 16, 2023

Related U.S. Application Data

(60) Provisional application No. 63/341,434, filed on May 13, 2022.

(51) Int. Cl.
*H04K 3/00* (2006.01)
*H04L 5/00* (2006.01)

(52) U.S. Cl.
CPC ............. *H04K 3/65* (2013.01); *H04L 5/0007* (2013.01); *H04L 5/0048* (2013.01)

(58) Field of Classification Search
CPC ....... H04K 3/65; H04L 5/0007; H04L 5/0048; H04L 5/0023; H04L 5/0053; H04L 5/0044; H04L 5/006
See application file for complete search history.

(56) References Cited

U.S. PATENT DOCUMENTS

| | | | | |
|---|---|---|---|---|
| 11,882,062 B2 * | 1/2024 | Cao | ......................... | H04L 5/0048 |
| 11,937,230 B2 * | 3/2024 | Cao | .................... | H04W 72/0453 |
| 2015/0382216 A1 * | 12/2015 | Tian | .................... | H04B 7/0452 |
| | | | | 370/252 |
| 2017/0048882 A1 * | 2/2017 | Li | ......................... | H04L 5/0051 |
| 2017/0111196 A1 * | 4/2017 | Su | ........................ | H04L 27/2602 |
| 2018/0124778 A1 * | 5/2018 | Verma | ................... | H04W 72/21 |
| 2018/0132176 A1 * | 5/2018 | Abraham | .......... | H04W 52/0235 |
| 2019/0191331 A1 * | 6/2019 | Park | ........................ | H04L 27/18 |

(Continued)

FOREIGN PATENT DOCUMENTS

| | | |
|---|---|---|
| EP | 3923530 A1 | 12/2021 |
| WO | WO 2021150083 A1 | 7/2021 |
| WO | WO 2022005194 A1 | 1/2022 |

OTHER PUBLICATIONS

Taiwan Intellectual Property Office, Office Action in Taiwan Patent Application No. 112117713, Nov. 6, 2023.

(Continued)

*Primary Examiner* — Yuwen Pan
*Assistant Examiner* — Swati Jain
(74) *Attorney, Agent, or Firm* — Andy M. Han; Han IP PLLC

(57) ABSTRACT

Techniques pertaining to enhanced long range (ELR) communication schemes in wireless communications are described. An apparatus (e.g., a station (STA)) performs an ELR communication by either: (i) transmitting an ELR physical-layer protocol data unit (PPDU); or (ii) receiving the ELR PPDU. The ELR PPDU includes a spoofing preamble, an ELR preamble and an ELR data portion.

19 Claims, 10 Drawing Sheets

| | | | OFDM SYMBOL 1 (WITH GI) | OFDM SYMBOL 1 (DUP WITHOUT GI) | | OFDM SYMBOL 2 (WITH GI) | OFDM SYMBOL 2 (DUP WITHOUT GI) | |
|---|---|---|---|---|---|---|---|---|
| SPOOFING PREAMBLE | ELR PREAMBLE | G I | 5MHZ RU TO USER 1 | 5MHZ RU TO USER 1 | G I | 5MHZ RU TO USER 1 | 5MHZ RU TO USER 1 | |
| | | | 5MHZ RU TO USER 1 (DUP) | 5MHZ RU TO USER 1 (DUP) | | 5MHZ RU TO USER 1 (DUP) | 5MHZ RU TO USER 1 (DUP) | . . . . . |
| | | | 5MHZ RU TO USER 1 (DUP) | 5MHZ RU TO USER 1 (DUP) | | 5MHZ RU TO USER 1 (DUP) | 5MHZ RU TO USER 1 (DUP) | |
| | | | 5MHZ RU TO USER 1 (DUP) | 5MHZ RU TO USER 1 (DUP) | | 5MHZ RU TO USER 1 (DUP) | 5MHZ RU TO USER 1 (DUP) | |

(56)     References Cited

U.S. PATENT DOCUMENTS

| | | | |
|---|---|---|---|
| 2019/0238301 A1* | 8/2019 | Verma | H04L 5/0046 |
| 2020/0136769 A1* | 4/2020 | Aboul-Magd | H04L 5/0091 |
| 2021/0385688 A1* | 12/2021 | Liu | H04L 5/0048 |
| 2021/0392661 A1* | 12/2021 | Cao | H04W 72/0453 |
| 2023/0032892 A1* | 2/2023 | Sammour | H04W 72/30 |
| 2023/0054803 A1* | 2/2023 | Lim | H04L 5/0094 |
| 2024/0250857 A1* | 7/2024 | Park | H04L 27/2621 |

OTHER PUBLICATIONS

European Patent Office, Extended European Search Report in European Patent Application No. 23172522.7, Oct. 5, 2023.

* cited by examiner

200

| SPOOFING PREAMBLE | ELR PREAMBLE | ELR DATA |

Figure 10:
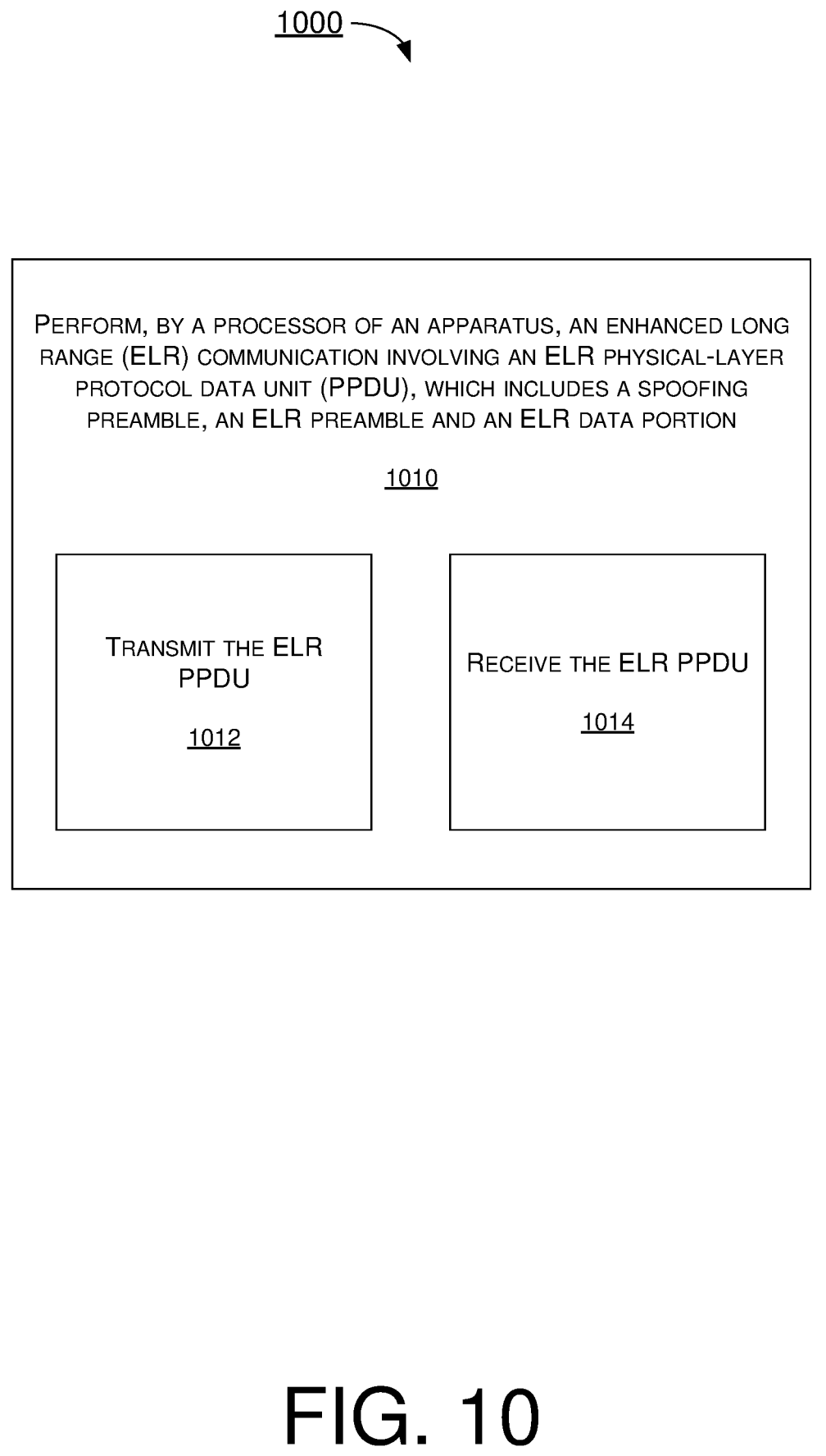

PERFORM, BY A PROCESSOR OF AN APPARATUS, AN ENHANCED LONG RANGE (ELR) COMMUNICATION INVOLVING AN ELR PHYSICAL-LAYER PROTOCOL DATA UNIT (PPDU), WHICH INCLUDES A SPOOFING PREAMBLE, AN ELR PREAMBLE AND AN ELR DATA PORTION

1010

TRANSMIT THE ELR PPDU

1012

RECEIVE THE ELR PPDU

ENHANCED LONG RANGE COMMUNICATION SCHEMES IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/341,434, filed 13 May 2022, the content of which herein being incorporated by reference in its entirety.

TECHNICAL FIELD

The present disclosure is generally related to wireless communications and, more particularly, to enhanced long range (ELR) communication schemes in wireless communications.

BACKGROUND

Unless otherwise indicated herein, approaches described in this section are not prior art to the claims listed below and are not admitted as prior art by inclusion in this section.

In wireless communications, such as wireless local area networks (WLANs) based on one or more Institute of Electrical and Electronics Engineers (IEEE) 802.11 standards, there are increasingly more applications that require ELR transmissions in WLANs. Such applications include, for example, wireless video surveillance, wireless video doorbells and Internet-of-Things (IoT) devices. The IEEE 802.11b standard provided a single-carrier, complementary code keying (CCK) modulated communication scheme. However, long range communications based on IEEE 802.11b tend to suffer low spectrum efficiency and poor network management. Thus, ELR communication schemes superior than IEEE 802.11b-based schemes that provide higher spectrum efficiency, better network management, longer coverage and higher data rate are urgently needed. Therefore, there is a need for a solution of ELR communication schemes in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to ELR communication schemes in wireless communications. It is believed that aforementioned issue(s) may be avoided or otherwise alleviated by implementation of one or more of the various proposed schemes described herein.

In one aspect, a method may involve a processor of an apparatus performing an ELR communication by either: (i) transmitting an ELR physical-layer protocol data unit (PPDU); or (ii) receiving the ELR PPDU. The ELR PPDU may include a spoofing preamble, an ELR preamble and an ELR data portion.

In another aspect, an apparatus may include a transceiver configured to communicate wirelessly and a processor coupled to the transceiver. The processor may perform, via the transceiver, an ELR communication by either: (i) transmitting an ELR physical-layer protocol data unit (PPDU); or (ii) receiving the ELR PPDU. The ELR PPDU may include a spoofing preamble, an ELR preamble and an ELR data portion.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design under a proposed scheme in accordance with the present disclosure.

FIG. 10 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to ELR communication schemes in wireless communications. According to the present disclosure, a number of possible solutions may be implemented separately or jointly. That is, although these possible solutions may be described below separately, two or more of these possible solutions may be implemented in one combination or another.

Figure 1:
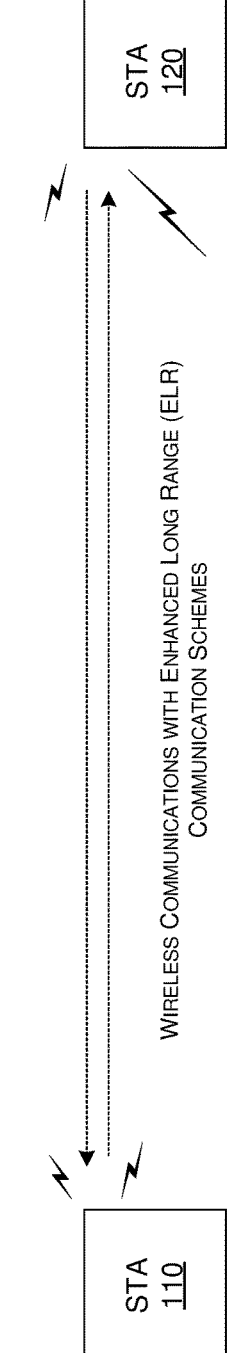
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 10 illustrate examples of implementation of various proposed schemes in network environment 100 in accordance with the present disclosure. The following description of various proposed schemes is provided with reference to FIG. 1~FIG. 10.

Referring to FIG. 1, network environment 100 may involve at least a STA 110 communicating wirelessly with a STA 120. Each of STA 110 and STA 120 may be a non-access point (non-AP) STA or, alternatively, either of STA 110 and STA 120 may function as an access point (AP) STA. Each of STA 110 and STA 120 may be a 60 GHz-capable MLO STA. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the techniques pertaining to ELR communication schemes in wireless communications in accordance with various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
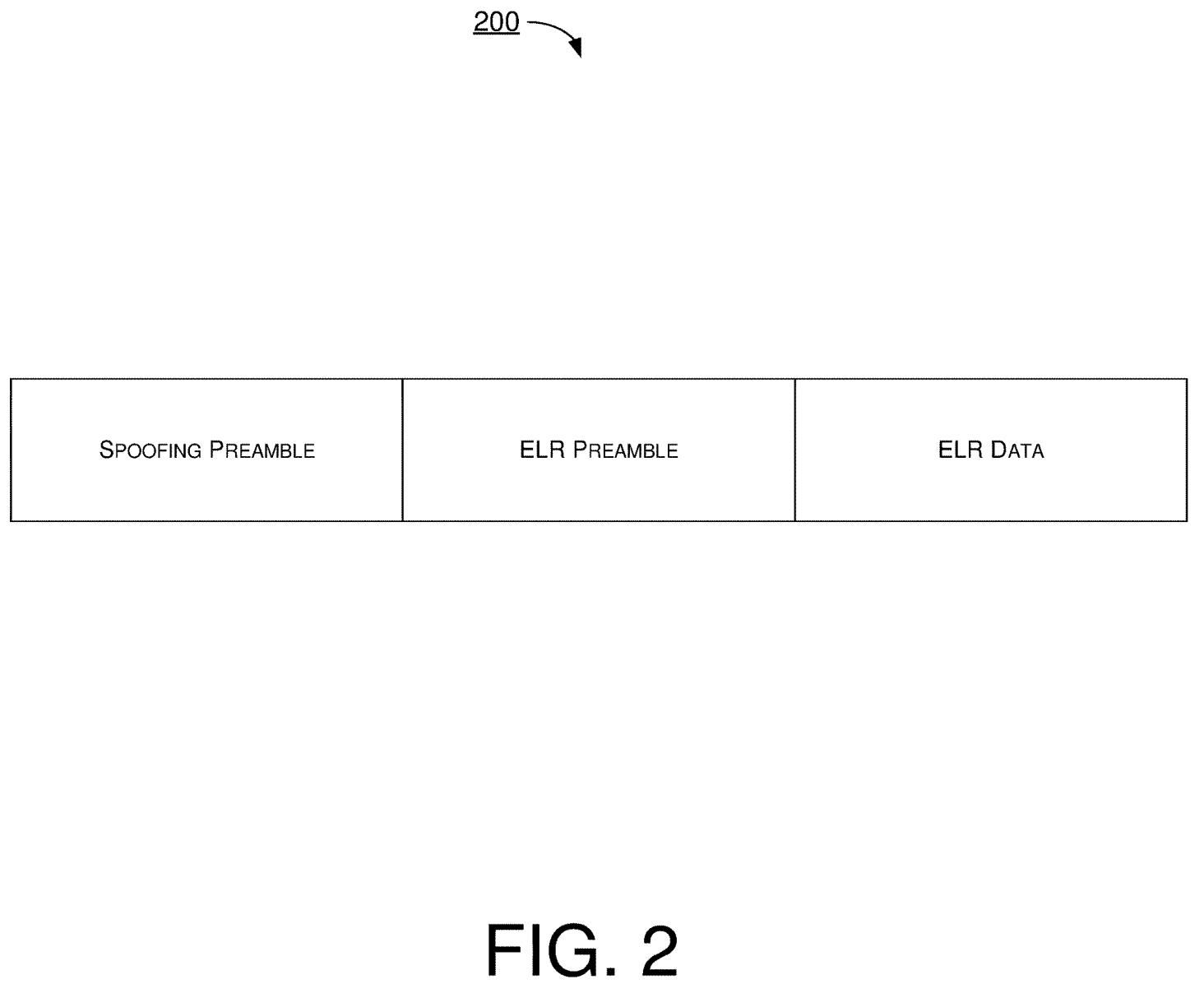

FIG. 2 illustrates an example design 200 under a proposed scheme in accordance with the present disclosure. Design 200 pertains to a design of an ELR PPDU. Under the proposed scheme, transmission of ELR PPDUs may use orthogonal frequency-division multiplexing (OFDM) and/or orthogonal frequency-division multiple access (OFDMA) modulation(s) in preamble signal fields and data portion thereof. Referring to FIG. 2, under the proposed scheme, each ELR PPDU may be composed of three function blocks, namely: spoofing preamble, ELR preamble, and ELR data portion. The spoofing preamble may be used to resolve the co-existence issue and avoid collision. The ELR preamble and ELR data portion may not be backward compatible to older and pre-existing IEEE 802.11 standards.

It is noteworthy that, in legacy preambles, a legacy short training field (L-STF), a legacy long training field (L-LTF) and a legacy signaling (L-SIG) field need to be added or prepended to a data field to spoof IEEE 802.11-compliant devices for clear channel assessment (CCA). Under a proposed scheme in accordance with the present disclosure, a 4-microsecond (4 μs) OFDM symbol with binary phase-shift keying (BPSK) modulation (herein interchangeably referred to as "BPSK-Symbol 1") may be added after the L-SIG field to spoof high-throughput (HT) devices based on the IEEE 802.11n standard. Furthermore, a second 4 μs OFDM symbol with BPSK modulation (herein interchangeably referred to as "BPSK-Symbol 2") may be added after BPSK-Symbol 1 to spoof very-high-throughput (VHT) devices based on the IEEE 802.11 ac standards. It is also noteworthy that HT and VHT devices behave differently than high-efficiency (HE) and extremely-high-throughput (EHT) devices when they encounter a signal field cyclic redundancy check (CRC) error.

Figure 3:
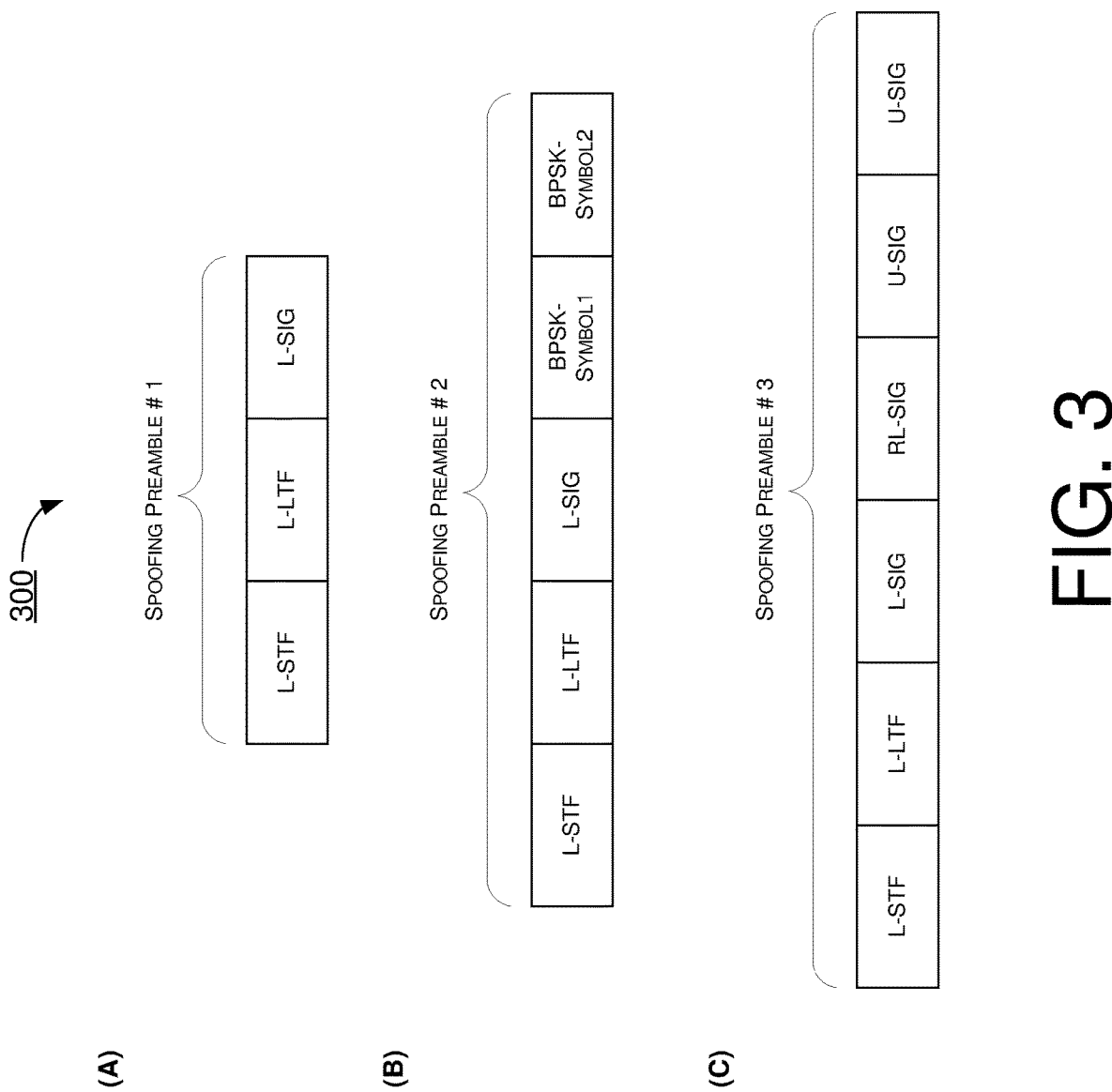
FIG. 3 is a diagram of an example design under a proposed scheme in accordance with the present disclosure.

FIG. 3 illustrates an example design 300 under a proposed scheme in accordance with the present disclosure. Design 300 pertains to a design of a spoofing preamble. Part (A) of FIG. 3 shows an example of a spoofing preamble #1 under the proposed scheme. As shown, spoofing preamble #1 may include an L-STF, an L-LTF and an L-SIG field. Part (B) of FIG. 3 shows an example of a spoofing preamble #2 under the proposed scheme. As shown, spoofing preamble #2 may include an L-STF, an L-LTF, an L-SIG, a BPSK-Symbol 1 and a BPSK-Symbol 2. Part (C) of FIG. 3 shows an example of a spoofing preamble #3 under the proposed scheme. As shown, spoofing preamble #3 may include an L-STF, an L-LTF, an L-SIG, a repeated legacy signaling (RL-SIG) field, a universal signaling (U-SIG) field followed by another U-SIG field.

Under the proposed scheme, for spoofing preamble #1, a following ELR signature sequence may need to be started with at least two BPSK modulated OFDM symbols. Under the proposed scheme, for spoofing preamble #2, the ELR signature sequence may be any sequence. Under the proposed scheme, for spoofing preamble #3, a portion of a preamble of an IEEE 802.11be-compliant multi-user (MU) PPDU may be used (e.g., from a legacy long training field (L-LTF) to an end of a U-SIG field thereof) with certain change to U-SIG contents. For instance, a value in the "PHY Version Identifier" field may be set to a non-zero value to indicate that this PPDU is for next generation beyond IEEE 802.11be (EHT). Additionally, a value in the "PPDU Type And Compression Mode" field may be set to indicate that this is a spoofing preamble for an ELR PPDU.

Figure 4:
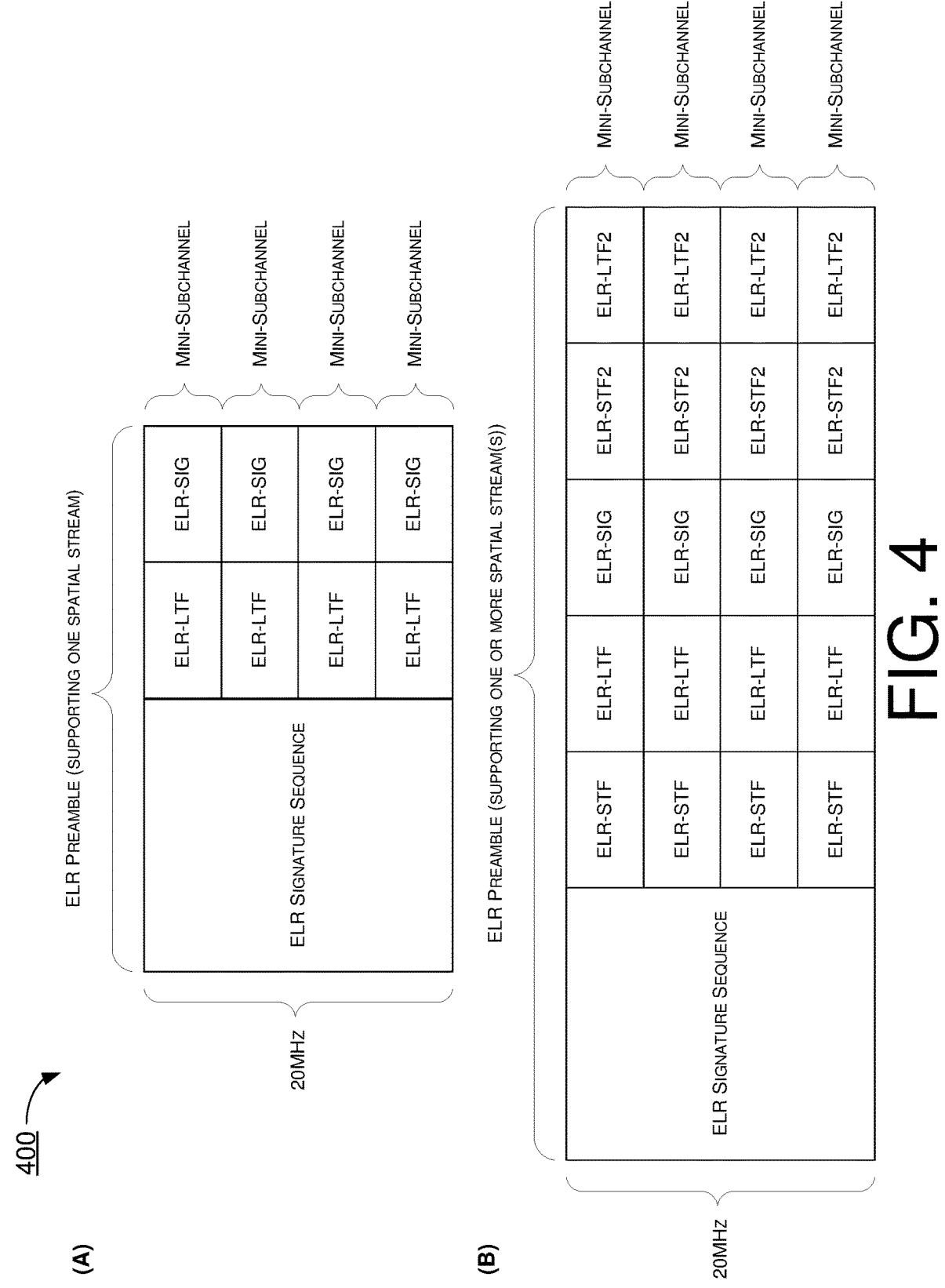
FIG. 4 is a diagram of an example design under a proposed scheme in accordance with the present disclosure.

FIG. 4 illustrates an example design 400 under a proposed scheme in accordance with the present disclosure. Design 400 pertains to designs of an ELR preamble #1. Part (A) of FIG. 4 shows an example of an ELR preamble that supports one spatial stream. Part (B) of FIG. 4 shows an example of an ELR preamble that supports one or multiple spatial streams. Under the proposed scheme, one ELR signature sequence may be used for pack detection and format detection of the respective ELR PPDU. Moreover, to enhance the range of preamble, mini-subchannel duplications in the frequency domain may be utilized in the ELR PPDU.

Figure 5:
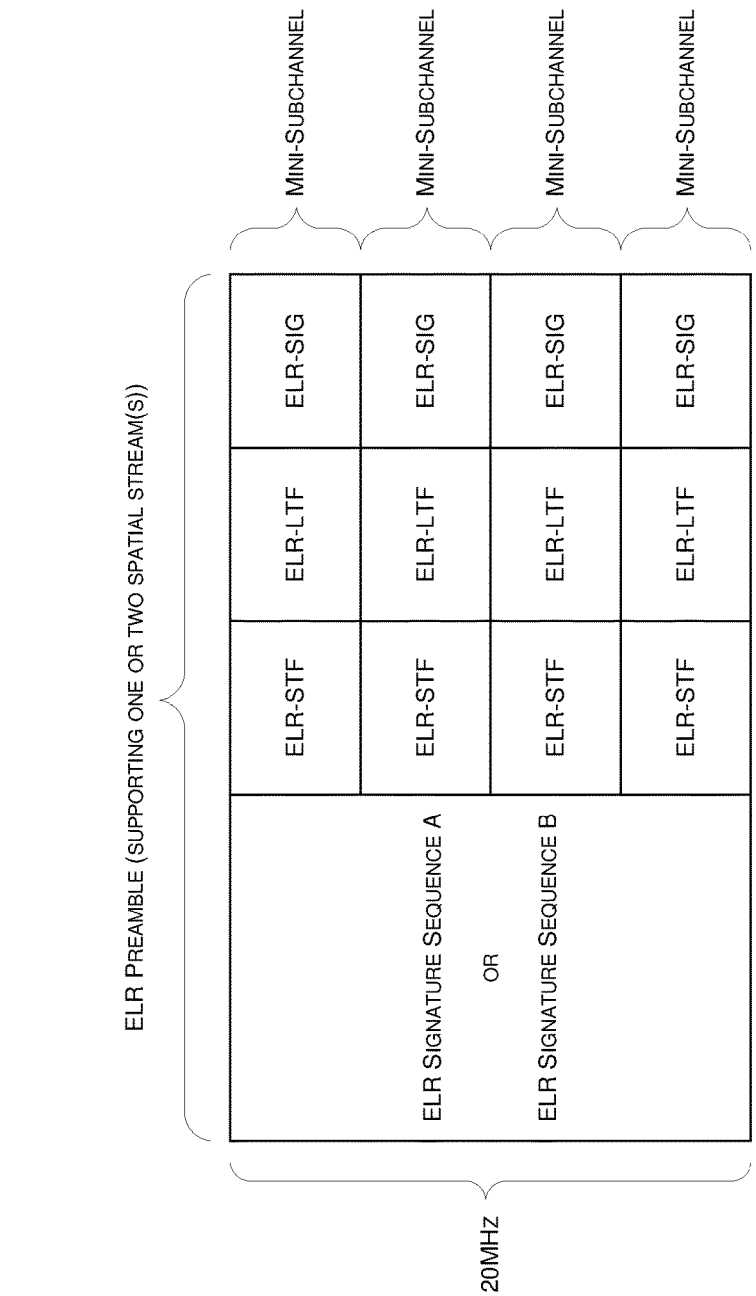
FIG. 5 is a diagram of an example design under a proposed scheme in accordance with the present disclosure.

FIG. 5 illustrates an example design 500 under a proposed scheme in accordance with the present disclosure. Design 500 pertains to a design of an ELR preamble #2. Under the proposed scheme, an ELR PPDU may be in a one-spatial-stream format or in a two-spatial-stream format. In particular, two ELR signature sequences (ELR signature sequence A and ELR signature sequence B) may be utilized to indicate whether a following ELR preamble and data are in the one-spatial-stream format or in the two-spatial-stream format. For instance, in case that ELR signature sequence A is sent, the ELR PPDU may be in the one-spatial-stream format. Moreover, in case that ELR signature sequence B is sent, the ELR PPDU may be in the two-spatial-stream format.

Figure 6:
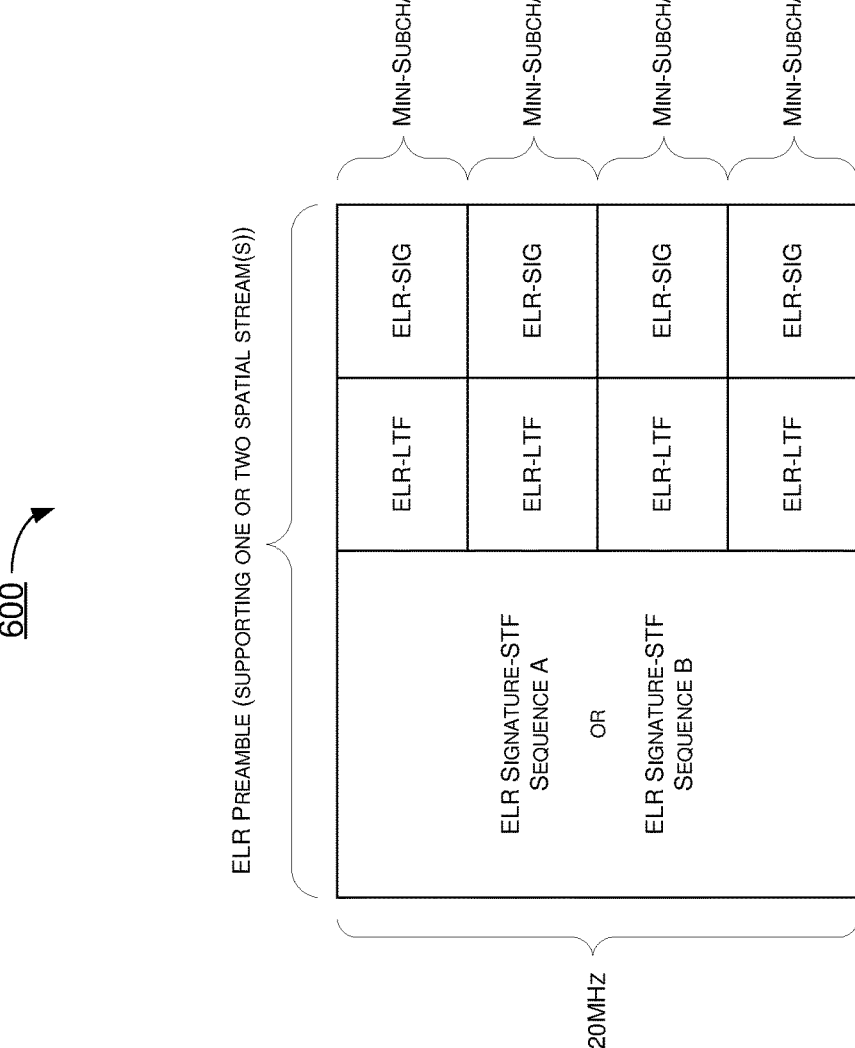
FIG. 6 is a diagram of an example design under a proposed scheme in accordance with the present disclosure.

FIG. 6 illustrates an example design 600 under a proposed scheme in accordance with the present disclosure. Design

600 pertains to a design of an ELR preamble #3. Under the proposed scheme, an ELR signature sequence may also be used for automatic gain control (AGC) and synchronization. Accordingly, the ELR signature sequence may be designed together with an ELR short training field (ELR-STF), and such signature sequence may herein be referred to as an "ELR signature-STF sequence." Under the proposed scheme, the ELR signature-STF sequence may be designed in the frequency domain with BPSK modulation (which may be used for spoofing purpose). Also, the ELR signature-STF sequence may be similar to a L-STF but may have a very low correlation with a L-STF sequence so as to avoid false detection of Wi-Fi STAs. For instance, one example of the ELR signature-STF sequence may be as follows:

$$LRSTF_{-26,26} = \{-1, 0, 0, 0, -1, 0, -1, 0, 0, 0, -1, 0, -1, 0,$$
$$0, 0, 1, 0, -1, 0, 0, 0, 1, 0, -1, 0, 0, 0, 1, 0, 1, 0, 0, 0,$$
$$-1, 0, 1, 0, 0, 0, 1, 0, -1, 0, 0, 0, -1, 0, 1, 0, 0, 0, 1\}$$

Under the proposed scheme, two ELR signature-STF sequences (A and B) may be utilized to indicate whether a following ELR preamble and data are in the one-spatial-stream format or in the two-spatial-stream format.

Figure 7:
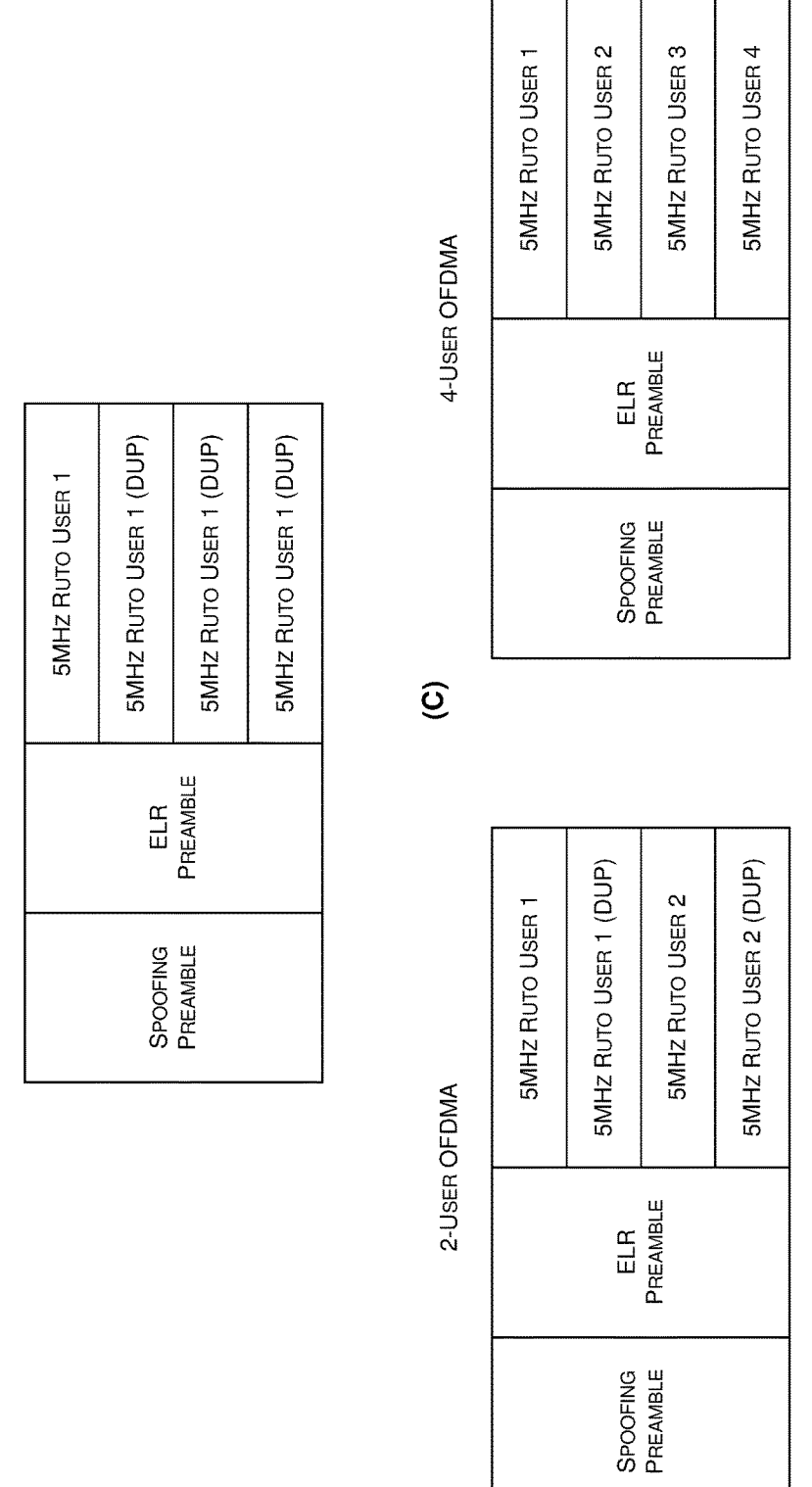
FIG. 7 is a diagram of an example design under a proposed scheme in accordance with the present disclosure.

FIG. 7 illustrates an example design 700 under a proposed scheme in accordance with the present disclosure. Design 700 pertains to a design of an ELR data portion for single-user (SU) and OFDMA scenarios. Under the proposed scheme, ELR data portion may be transmitted to a single user using OFDM or to multiple users using OFDMA. To simplify implementation and signaling, a resource unit (RU) size for an ELR PPDU may be fixed for each user. For instance, only a 26-tone RU or a 52-tone RU may be allowed. Moreover, to simplify implementation and signaling, a maximum number of users may be limited to 4 or 8 or 9. It is noteworthy that, for different numbers of users, duplications may also be different. Under the proposed scheme, to reach a similar range, difference modulation and coding schemes (MCSs) may be applied. For instance, in transmission of a 20 MHz ELR PPDU, quadrature phase-shift keying (QPSK)+dual carrier modulation (DCM)+½ coding may be applied to SU transmissions, and BPSK+DCM+½ coding may be used for two users, while BPSK+DCM+% coding may be used for four users. Part (A) of FIG. 7 shows an example of a scenario for single user or 1-user OFDMA, with a 5 MHz subchannel for a same user (e.g., user 1) duplicated across the operating bandwidth (e.g., 4 times as shown in FIG. 7). Part (B) of FIG. 7 shows an example of a scenario of 2-user OFDMA, with a 5 MHz subchannel for a first user (e.g., user 1) duplicated once and another 5 MHz subchannel for a second user (e.g., user 2) duplicated once. Part (C) of FIG. 7 shows an example of a scenario of 4-user OFDMA, with no duplication of 5 MHz subchannels as each of the 5 MHz subchannels is used for a respective user of four users (e.g., user 1, user 2, user 3 and user 4).

Figure 8:
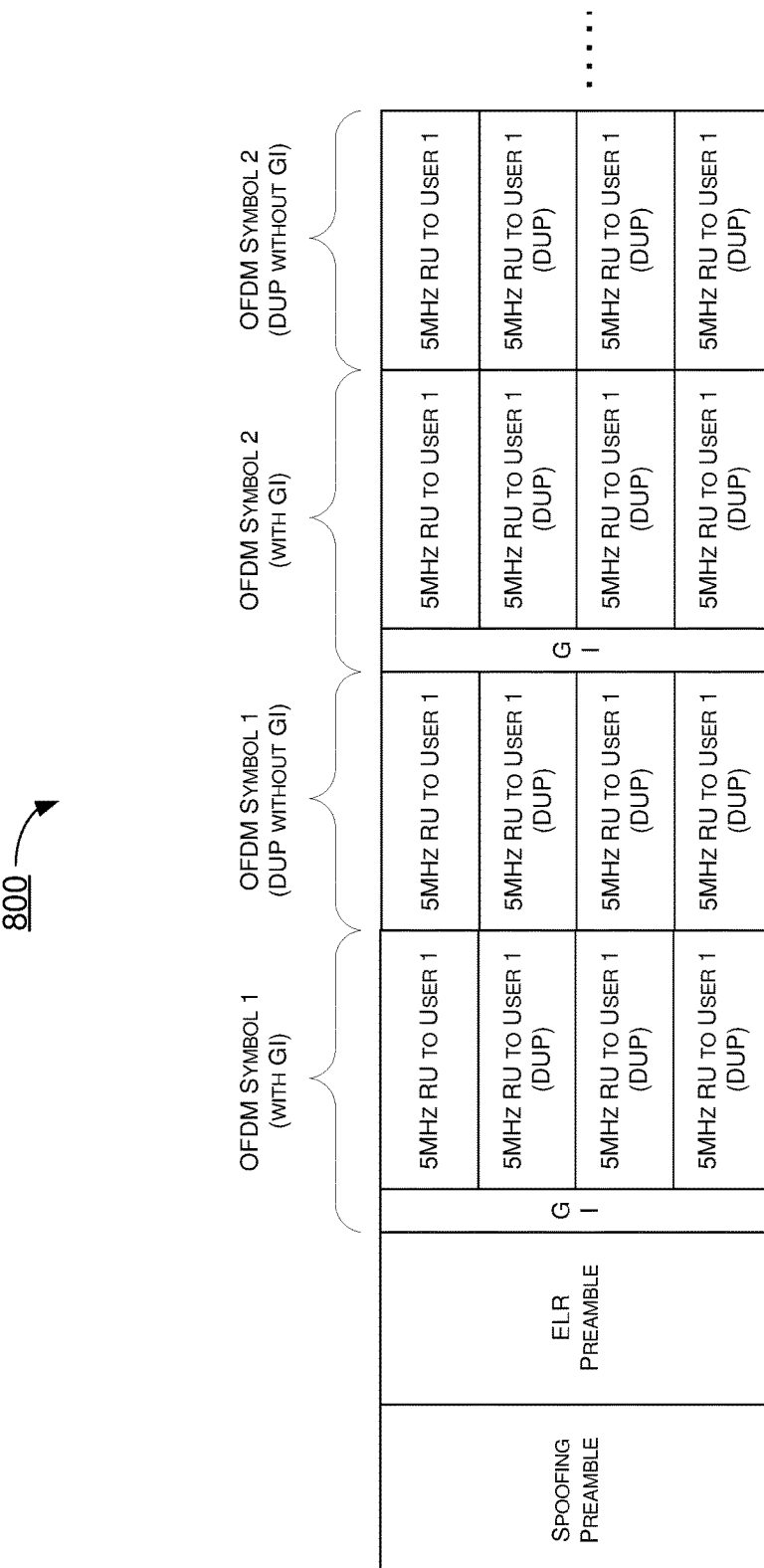
FIG. 8 is a diagram of an example design under a proposed scheme in accordance with the present disclosure.

FIG. 8 illustrates an example design 800 under a proposed scheme in accordance with the present disclosure. Design 800 pertains to a design of frequency and/or time domain duplication of an ELR data portion. Under the proposed scheme, to achieve the enhanced long range in transmission, ELR data portion may be duplicated in either or both of the frequency domain and the time domain. For instance, a 5 MHz subchannel may be duplicated (e.g., same as a 52-tone RU) to achieve a longer range by 6 dB. Under the proposed scheme, ELR data OFDMA symbols may be duplicated in the time domain as shown in FIG. 8. It is noteworthy that the guard interval (GI) between two adjacent duplicated OFDMA symbols may be removed to enhance spectrum efficiency. Referring to FIG. 8, an OFDMA symbol 1 may be for user 1 with duplicated 5 MHz subchannels, and the OFDMA symbol 1 may be duplicated in the time domain (without GI for the time domain duplication). Similarly, an OFDMA symbol 2 may be for user 2 with duplicated 5 MHz subchannels, and the OFDMA symbol 2 may be duplicated in the time domain (without GI for the time domain duplication). Of course, the GI may be optional and may be omitted to improve spectrum efficiency.

Illustrative Implementations

Figure 9:
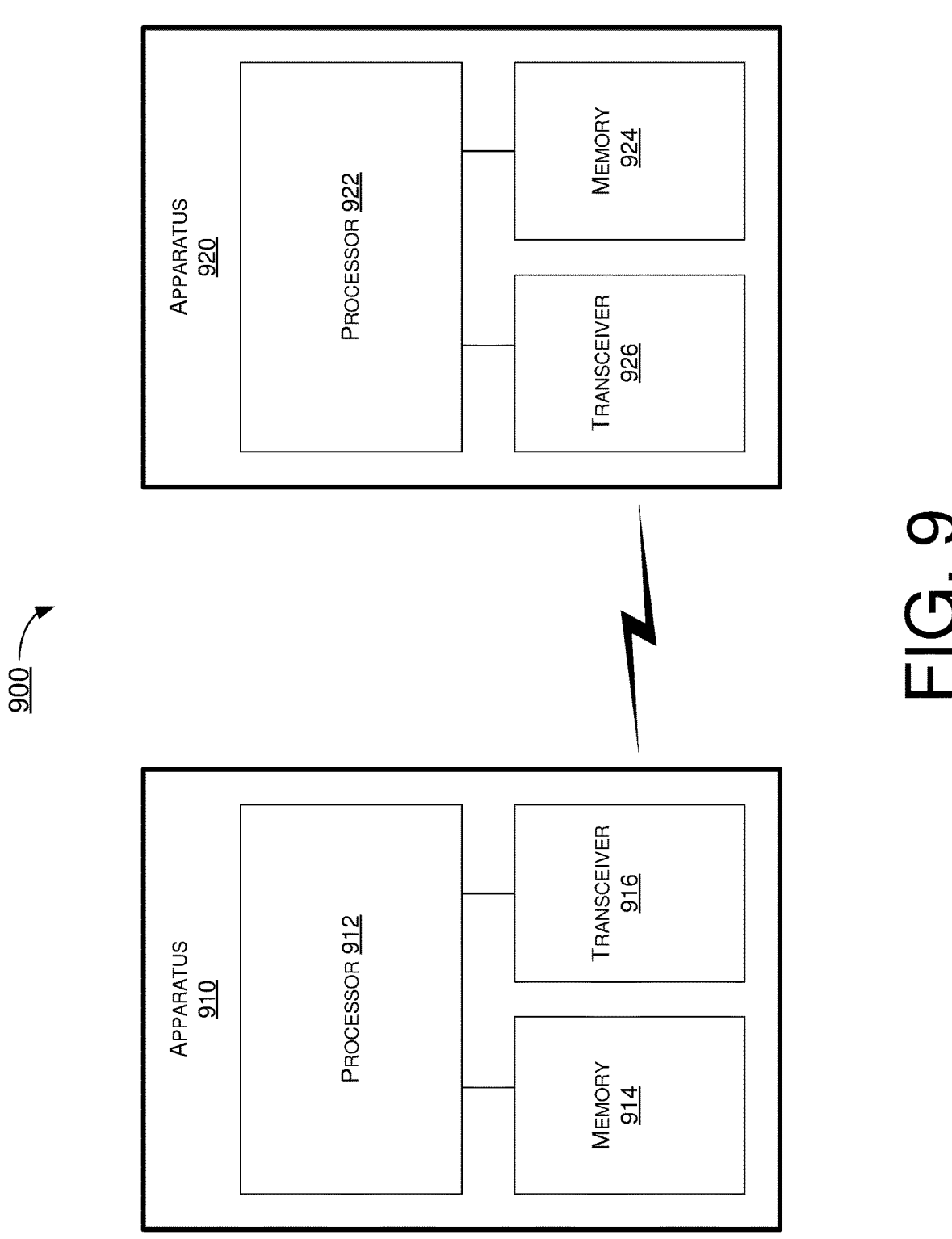
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to ELR communication schemes in wireless communications, including the various schemes described above with respect to various proposed designs, concepts, schemes, systems and methods described above as well as processes described below. For instance, apparatus 910 may be implemented in STA 110 and apparatus 920 may be implemented in STA 120, or vice versa.

Each of apparatus 910 and apparatus 920 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, or one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to ELR communication schemes in wireless communications in accordance with various implementations of the present disclosure.

In some implementations, apparatus 910 may also include a transceiver 916 coupled to processor 912. Transceiver 916 may include a transmitter capable of wirelessly transmitting and a receiver capable of wirelessly receiving data. In some implementations, apparatus 920 may also include a transceiver 926 coupled to processor 922. Transceiver 926 may include a transmitter capable of wirelessly transmitting and a receiver capable of wirelessly receiving data. It is noteworthy that, although transceiver 916 and transceiver 926 are illustrated as being external to and separate from processor 912 and processor 922, respectively, in some implementations, transceiver 916 may be an integral part of processor 912 as a system on chip (SoC), and transceiver 926 may be an integral part of processor 922 as a SoC.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (FeRAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as STA 110, and apparatus 920, as STA 120, is provided below. It is noteworthy that, although a detailed description of capabilities, functionalities and/or technical features of apparatus 920 is provided below, the same may be applied to apparatus 910 although a detailed description thereof is not provided solely in the interest of brevity. It is also noteworthy that, although the example implementations described below are provided in the context of WLAN, the same may be implemented in other types of networks.

Under various proposed schemes pertaining to ELR communication schemes in wireless communications in accordance with the present disclosure, with apparatus 910 implemented in or as STA 110 and apparatus 920 implemented in or as STA 120 in network environment 100, processor 912 of apparatus 910 may perform, via transceiver 916, an ELR communication involving an ELR PPDU. The ELR PPDU may include a spoofing preamble, an ELR preamble and an ELR data portion. For instance, processor 912 may transmit or receive the ELR PPDU.

In some implementations, the ELR PPDU may be transmitted using an OFDM modulation or an OFDMA modulation on preamble signal fields and the ELR data portion of the ELR PPDU.

In some implementations, the spoofing preamble may include a L-STF, a L-LTF and a L-SIG field.

In some implementations, the spoofing preamble may include a L-STF, a L-LTF, a L-SIG field, a first OFDM symbol with BPSK modulation, and a second OFDM symbol with BPSK modulation.

In some implementations, the spoofing preamble may include a L-STF, a L-LTF, a L-SIG field, a RL-SIG field, a U-SIG field, and another U-SIG field. In some implementations, the spoofing preamble may be similar to an IEEE 802.11be MU PPDU preamble except that a field in at least one of the U-SIG fields may be set to indicate that the spoofing preamble is part of the ELR PPDU.

In some implementations, the ELR preamble may support one spatial stream. Moreover, the ELR preamble may include an ELR signature sequence, an ELR-LTF and an ELR-SIG field. Furthermore, the ELR-LTF and the ELR-SIG field may be duplicated across a plurality of subchannels.

In some implementations, the ELR preamble may support one spatial stream. Additionally, the ELR preamble may include an ELR signature sequence, a first ELR-STF, a first ELR-LTF and an ELR-SIG field, a second ELR-STF and a second ELR-LTF. Moreover, the first ELR-STF, the first ELR-LTF, the ELR-SIG field, the second ELR-STF and the second ELR-LTF may be duplicated across a plurality of subchannels.

In some implementations, the ELR preamble may support up to two spatial streams. Moreover, the ELR preamble may include a respective ELR signature sequence for each user up to two users, an ELR-STF, an ELR-LTF and an ELR-SIG field. Furthermore, the ELR-STF, the ELR-LTF and the ELR-SIG field may be duplicated across a plurality of subchannels.

In some implementations, the ELR preamble may support up to two spatial streams. Additionally, the ELR preamble may include a respective ELR signature plus STF sequence for each user up to two users, an ELR-LTF and an ELR-SIG field. Moreover, the ELR-LTF and the ELR-SIG field may be duplicated across a plurality of subchannels.

In some implementations, the ELR data portion may be transmitted to a single user using an OFDM modulation or to multiple users using an OFDMA modulation. In some implementations, a maximum number of users of the multiple users may be 4, 8 or 9.

In some implementations, in an event that the ELR data portion is transmitted to the single user, the ELR data portion may be duplicated across a plurality of subchannels.

In some implementations, in an event that the ELR data portion is transmitted to two users, a first subchannel carrying first data for a first user may be duplicated at least once while a second subchannel carry second data for a second user may be duplicated at least once.

In some implementations, in an event that the ELR data portion is transmitted to four users, each subchannel of four subchannels may carry respective data for a respective user of the four users.

In some implementations, the ELR data portion may be duplicated in either or both of a frequency domain and a time domain.

Illustrative Processes

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to ELR communication schemes in wireless communications in accordance with the present disclosure. Process 1000 may include one or more operations, actions, or functions as illustrated by one or more of blocks 1010 as well as sub-blocks 1012 and 1014. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 implemented in or as STA 110 functioning as a non-AP STA and apparatus 920 implemented in or as STA 120 functioning as an AP STA of a wireless network such as a WLAN in network environment 100 in accordance with one or more of IEEE 802.11 standards. Process 1000 may begin at block 1010.

At 1010, process 1000 may involve processor 912 of apparatus 910 performing, via transceiver 916, an ELR communication involving an ELR PPDU, which may be represented by 1012 and 1014. The ELR PPDU may include a spoofing preamble, an ELR preamble and an ELR data portion.

At 1012, process 1000 may involve processor 912 transmitting the ELR PPDU.

At 1014, process 1000 may involve processor 912 receiving the ELR PPDU.

In some implementations, the ELR PPDU may be transmitted using an OFDM modulation or an OFDMA modulation on preamble signal fields and the ELR data portion of the ELR PPDU.

In some implementations, the spoofing preamble may include a L-STF, a L-LTF and a L-SIG field.

In some implementations, the spoofing preamble may include a L-STF, a L-LTF, a L-SIG field, a first OFDM symbol with BPSK modulation, and a second OFDM symbol with BPSK modulation.

In some implementations, the spoofing preamble may include a L-STF, a L-LTF, a L-SIG field, a RL-SIG field, a U-SIG field, and another U-SIG field. In some implementations, the spoofing preamble may be similar to an IEEE 802.11be MU PPDU preamble except that a field in at least one of the U-SIG fields may be set to indicate that the spoofing preamble is part of the ELR PPDU.

In some implementations, the ELR preamble may support one spatial stream. Moreover, the ELR preamble may include an ELR signature sequence, an ELR-LTF and an ELR-SIG field. Furthermore, the ELR-LTF and the ELR-SIG field may be duplicated across a plurality of subchannels.

In some implementations, the ELR preamble may support one spatial stream. Additionally, the ELR preamble may include an ELR signature sequence, a first ELR-STF, a first ELR-LTF and an ELR-SIG field, a second ELR-STF and a second ELR-LTF. Moreover, the first ELR-STF, the first ELR-LTF, the ELR-SIG field, the second ELR-STF and the second ELR-LTF may be duplicated across a plurality of subchannels.

In some implementations, the ELR preamble may support up to two spatial streams. Moreover, the ELR preamble may include a respective ELR signature sequence for each user up to two users, an ELR-STF, an ELR-LTF and an ELR-SIG field. Furthermore, the ELR-STF, the ELR-LTF and the ELR-SIG field may be duplicated across a plurality of subchannels.

In some implementations, the ELR preamble may support up to two spatial streams. Additionally, the ELR preamble may include a respective ELR signature plus STF sequence for each user up to two users, an ELR-LTF and an ELR-SIG field. Moreover, the ELR-LTF and the ELR-SIG field may be duplicated across a plurality of subchannels.

In some implementations, the ELR data portion may be transmitted to a single user using an OFDM modulation or to multiple users using an OFDMA modulation. In some implementations, a maximum number of users of the multiple users may be 4, 8 or 9.

In some implementations, in an event that the ELR data portion is transmitted to the single user, the ELR data portion may be duplicated across a plurality of subchannels.

In some implementations, in an event that the ELR data portion is transmitted to two users, a first subchannel carrying first data for a first user may be duplicated at least once while a second subchannel carry second data for a second user may be duplicated at least once.

In some implementations, in an event that the ELR data portion is transmitted to four users, each subchannel of four subchannels may carry respective data for a respective user of the four users.

In some implementations, the ELR data portion may be duplicated in either or both of a frequency domain and a time domain.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
performing, by a processor of an apparatus, an enhanced long range (ELR) communication by either:
transmitting an ELR physical-layer protocol data unit (PPDU); or
receiving the ELR PPDU,
wherein the ELR PPDU comprises a spoofing preamble, an ELR preamble and an ELR data portion,
wherein the spoofing preamble comprises a legacy short training field (L-STF), a legacy long training field (L-LTF) and a legacy signaling (L-SIG) field,
wherein the ELR preamble comprises an ELR signature sequence, an ELR short training field (ELR-STF), an ELR long training field (ELR-LTF) and an ELR signaling (ELR-SIG) field,
wherein the ELR data portion carries data to be transmitted to one or more users, and
wherein the ELR signature sequence is a physical-layer sequence associated with training and indicates whether the ELR preamble and the ELR data portion are in a one-spatial-stream format or in a two-spatial-stream format.

2. The method of claim 1, wherein the ELR PPDU is transmitted using an orthogonal frequency-division multiplexing (OFDM) modulation or an orthogonal frequency-divisional multiple access (OFDMA) modulation on preamble signal fields and the ELR data portion of the ELR PPDU.

3. The method of claim 1, wherein the spoofing preamble further comprises a first orthogonal frequency-division multiplexing (OFDM) symbol with binary phase-shift keying (BPSK) modulation, and a second OFDM symbol with BPSK modulation.

4. The method of claim 1, wherein the spoofing preamble further comprises a repeated legacy signaling (RL-SIG) field, a universal signaling (U-SIG) field, and another U-SIG field.

5. The method of claim 4, wherein the spoofing preamble is similar to an Institute of Electrical and Electronics Engineers (IEEE) 802.11be multi-user (MU) PPDU preamble except that a field in at least one of the U-SIG fields is set to indicate that the spoofing preamble is part of the ELR PPDU.

6. The method of claim 1, wherein the ELR preamble supports one spatial stream, and wherein the ELR-LTF and the ELR-SIG field are duplicated across a plurality of subchannels.

7. The method of claim 1, wherein the ELR preamble supports one spatial stream and further comprises a second ELR-STF and a second ELR-LTF, and wherein the ELR-STF, the ELR-LTF, the ELR-SIG field, the second ELR-STF and the second ELR-LTF are duplicated across a plurality of subchannels.

8. The method of claim 1, wherein the ELR preamble supports up to two spatial streams and comprises a respective ELR signature sequence for each user up to two users, and wherein the ELR-STF, the ELR-LTF and the ELR-SIG field are duplicated across a plurality of subchannels.

9. The method of claim 1, wherein the ELR preamble supports up to two spatial streams and comprises a respective ELR signature plus short training field (STF) sequence for each user up to two users, and wherein the ELR-LTF and the ELR-SIG field are duplicated across a plurality of subchannels.

10. The method of claim 1, wherein the ELR data portion is transmitted to a single user using an orthogonal frequency-division multiplexing (OFDM) modulation or to multiple users using an orthogonal frequency-divisional multiple access (OFDMA) modulation.

11. The method of claim 10, wherein a maximum number of users of the multiple users is 4, 8 or 9.

12. The method of claim 10, wherein, in an event that the ELR data portion is transmitted to the single user, the ELR data portion is duplicated across a plurality of subchannels.

13. The method of claim 10, wherein, in an event that the ELR data portion is transmitted to two users, a first subchannel carrying first data for a first user is duplicated at least once and a second subchannel carry second data for a second user is duplicated at least once.

14. The method of claim 10, wherein, in an event that the ELR data portion is transmitted to four users, each subchannel of four subchannels carries respective data for a respective user of the four users.

15. The method of claim 1, wherein the ELR data portion is duplicated in either or both of a frequency domain and a time domain.

16. An apparatus, comprising:

a transceiver configured to communicate wirelessly; and a processor coupled to the transceiver and configured to perform, via the transceiver, an enhanced long range (ELR) communication by either:

transmitting an ELR physical-layer protocol data unit (PPDU); or receiving the ELR PPDU, wherein the ELR PPDU comprises a spoofing preamble, an ELR preamble and an ELR data portion, wherein the spoofing preamble comprises a legacy short training field (L-STF), a legacy long training field (L-LTF) and a legacy signaling (L-SIG) field, wherein the ELR preamble comprises an ELR signature sequence, an ELR short training field (ELR-STF), an ELR long training field (ELR-LTF) and an ELR signaling (ELR-SIG) field, wherein the ELR data portion carries data to be transmitted to one or more users, and wherein the ELR signature sequence is a physical-layer sequence associated with training and indicates whether the ELR preamble and the ELR data portion are in a one-spatial-stream format or in a two-spatial-stream format.

17. The apparatus of claim 16, wherein the spoofing preamble further comprises a repeated legacy signaling (RL-SIG) field, a universal signaling (U-SIG) field, and another U-SIG field, and wherein the spoofing preamble is similar to an Institute of Electrical and Electronics Engineers (IEEE) 802.11be multi-user (MU) PPDU preamble except that a field in at least one of the U-SIG fields is set to indicate that the spoofing preamble is part of the ELR PPDU.

18. The apparatus of claim 16, wherein the ELR preamble supports up to two spatial streams and comprises a respective ELR signature plus short training field (STF) sequence for each user up to two users, and wherein the ELR-LTF and the ELR-SIG field are duplicated across a plurality of subchannels.

19. The apparatus of claim 16, wherein the ELR data portion is duplicated in either or both of a frequency domain and a time domain.

* * * * *